July 25, 1961 L. GRULET ET AL 2,993,764
APPARATUS FOR PURIFICATION BY SUBLIMATION
Filed Dec. 6, 1957
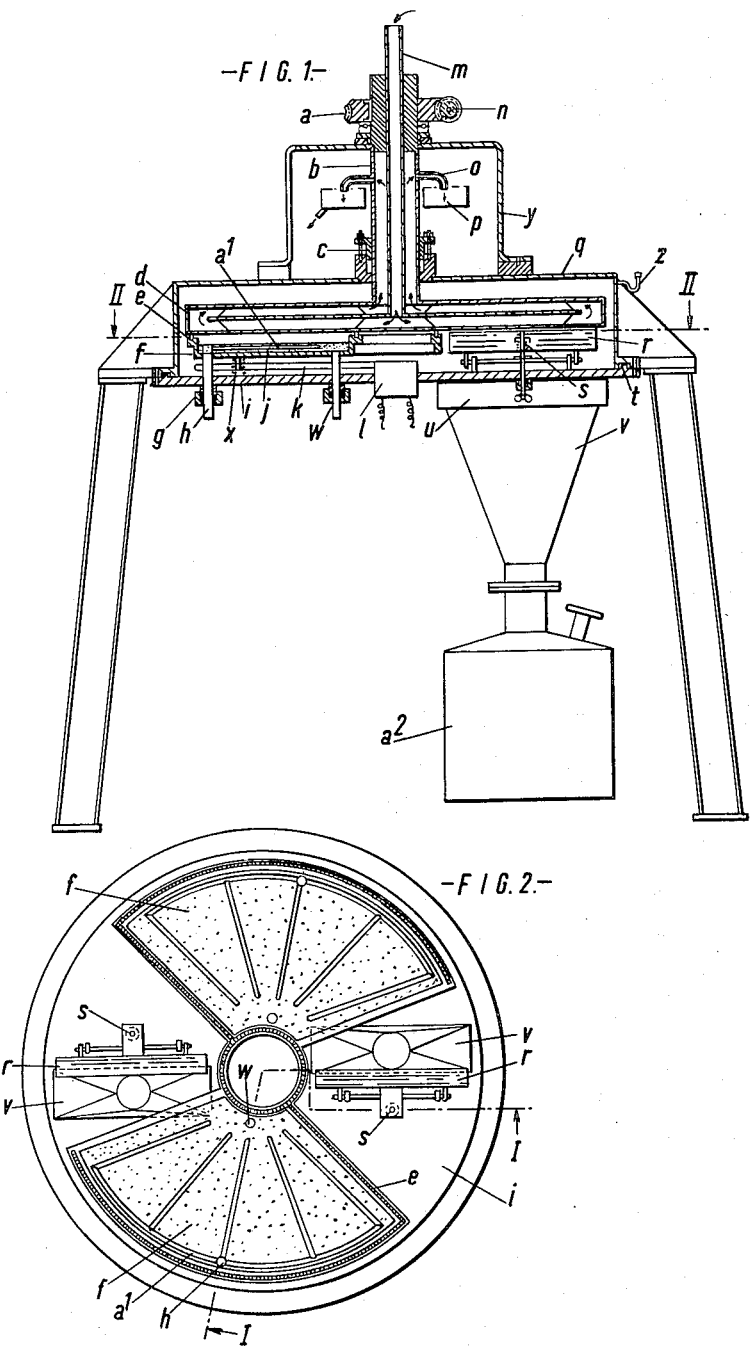
INVENTORS
LOUIS GRULET
RENE PIERRE VIKTOR ROE
BY
ATTORNEYS

United States Patent Office 2,993,764
Patented July 25, 1961

2,993,764
APPARATUS FOR PURIFICATION BY SUBLIMATION

Louis Grulet, La Marniere, Les Authieux-sur-le-Port St.-Ouen, Oissel, and Rene Pierre Victor Roe, Rouen, France, assignors to Compagnie Française des Matieres Colorantes, Paris, France, a French company
Filed Dec. 6, 1957, Ser. No. 701,263
Claims priority, application France Dec. 7, 1956
8 Claims. (Cl. 23—264)

The present invention concerns an apparatus for purification by sublimation.

The processes of purification by sublimation are generally classed in two groups. The first process, called "true sublimation," comprises heating the substance to be purified, which is in the solid state, and condensing to the solid state the vapours which are emitted. The condensation temperatures are lower than that of the triple point; consequently the liquid phase never appears. This technique is only applicable industrially to substances having a large vapour pressure in the solid state. For substances having a small vapour pressure in the solid state, the operation must be effected under a very high vacuum; the diffusion of the vapours in these conditions, however, is extremely slow and the production capacity very low. The second process, called "pseudo-sublimation" can be carried out on these latter substances. The product to be sublimed is brought to the liquid state at a temperature such that its vapour pressure becomes considerable, this temperature, however, being lower than the boiling point under the vacuum in question. The vapours given off are collected in the solid state in a condenser.

In both cases, industrial manufacture of a subliming apparatus must take into account the following two essential factors:

(1) The gaseous molecules emitted by a solid, or by a liquid, at temperatures lower than the boiling point have diffusion velocities which are generally slow. The transfers of material toward the cold wall of the subliming apparatus are small and it is therefore necessary to constuct very large apparatus in order to ensure a large output. In order to carry the vapours, certain processes use an "entrainer"—an inert gas introduced into the apparatus at a controlled rate of flow. In the case where a high vacuum is necessary, this solution of the problem increases the cost of pumping equipment to a considerable extent.

(2) The accumulation of the solid sublimed product on the condenser rapidly diminishes the efficiency of the latter in the course of one operation. This disadvantage is all the more serious as hard crusts are generally formed which can only be detached from the walls by energetic methods and particles of metal are then pulled off from the walls. When the products must be obtained free from any trace of metal, particularly of iron, the choice of the material for the apparatus becomes an insoluble problem.

An object of the present invention is to provide an apparatus for purification by sublimation, which may be used both for true sublimation and for pseudo-sublimation.

According to the present invention apparatus for purification by sublimation is provided which comprises a vacuum-tight casing enclosing a fixed plate formed from two angularly spaced sectors of a circle secured at their apices to a common support, means for heating the fixed plate, a rotating cooled disc disposed in closely spaced relationship above the fixed plate, and scraping means disposed between the sectors.

The heating means for the fixed plate may be for example electrical and the rotating disc may be cooled, for example, by water.

Compared with already known apparatus that of the present invention allows a large output with reduced dimensions. This advantage is due to the fact that the distance travelled by the gaseous molecules between the hot source and the cooled disc of the subliming apparatus is limited to, for example, some millimetres. On the other hand, instead of accumulating on the cooled disc, the solid sublimed product from its formation is immediately carried away outside the sublimation chamber by means of the scrapers. This feature is one of the causes of the purity of the products obtained; in addition, it follows that the cooled disc condenser continually keeps its maximum efficiency. The apparatus is thus capable of continuous operation. Owing to this, the fineness of the crystals of the purified product can be regulated as desired, by allowing them to grow more or less large in the sublimation chamber and they can be obtained of regular size, the inconvenience of a subsequent grinding being thus avoided.

In addition, it is possible to work at moderate temperature, owing to the good diffusion of the vapours. The risk of decomposition of the sublimed product during heating is thereby considerably reduced, the more so as the product remains in the heated plate for a very short time. The final product can therefore be obtained very rich in pure product.

The apparatus of the present invention is more economic than already known apparatus; it allows, in fact, a large output to be obtained and its consumption of energy is very small by reason of the absence of idle time and the small mass of water in the cooling plate. Finally, it allows operation with a medium vacuum, even when the vapour pressure of the substance to be purified is no more than a few millimetres of mercury at the temperature in question.

The invention will be more clearly understood by reference to the accompanying drawings in which one embodiment of the invention is illustrated. In these drawings FIGURE 1 is a sectional elevation viewed along the line I—I of FIGURE 2 and FIGURE 2 is a sectional plan view, partly cut away, along the line II—II of FIGURE 1.

The apparatus shown in the drawings comprises a fixed plate $f$ formed from two angularly spaced sectors of a circle provided with a flange on their outer periphery. On the side at which the purified product is disengaged, the flange consists of a simple welded rib; a space of about 20 mms. remains between the disc $d$ and this border to allow the passage of the purified product to the scrapers. On the remainder of the periphery of each of the two sectors of plate $f$ the border is thicker and has a groove in its upper part in which is placed a packing $e$, represented by hatching on FIGURE 2. The plate $f$ is applied against the movable disc $d$ by means of springs $x$ inserted between the plate $f$ and the bottom $i$ of the casing. A feed pipe $h$ for introducing product to be purified and a discharge pipe $w$ for the impurities open on the base of each of the sectors of the plate $f$. The inside of the sectors in filled with an inert material $j$ the nature of which is suited to the product to be treated: for example, sand or steel filings. The role of the inert material is to increase the surface of evaporation, to regulate the temperature and to avoid throwing up of liquid. A distributing slope $a^1$ connected to the feed pipe $h$ in each sector ensures the distribution of the product to be sublimed through the mass of insert material $j$.

The fixed plate $f$ is heated by a device $k$, which may be an electrical resistance or any other source of heat. The temperature of the sectors of the fixed plate $f$ is controlled by means of thermo-electrically-coupled pyrometers.

A hollow movable disc $d$ mounted on a hollow shaft $b$ is in contact with the raised edges of the fixed plate $f$. It is driven in a uniform circular movement and obtains this movement from a wheel device $a$ and worm $n$. The disc $d$ is cooled by circulation of water which enters by a central tube $m$ arranged at the centre of the hollow shaft $b$, and which leaves by the annular space contained between tube $m$ and shaft $b$ and by two overflow pipes $o$ discharging into a fixed circular tray $p$.

Articulated scrapers $r$, placed between the sectors of the plate $f$, are in flexible contact with the lower face of the disc $d$. This contact is ensured by the action of tension springs $s$ adjustable from outside the apparatus.

A vacuum-tight casing serves as support for the assembly of parts described above. It is composed on the one hand of a base $i$ on which are fastened the heating device $k$ with sealed outlets connected in a box $l$, the fixed plate $f$, the scrapers $r$ and their articulating and adjusting arrangement, the hoppers $v$ for recovering the product, these hoppers being cooled by circulation of water in an outer chamber $u$, the legs supporting the apparatus and, on the other hand, of a circular lid $q$ fixed on the base $i$ by a grooved flange $t$ and carrying at its centre a stuffing box $c$ for guiding the shaft $b$ of the disc $d$.

The arch $y$ supporting the mechanism for moving the disc $d$ is fixed on the lid. A vacuum indicator $z$ is welded on the side of the lid.

In readiness for a purification operation, the vacuum is established inside the apparatus. The plate $f$ and its inert material $j$ are taken to a certain temperature dependent upon the product to be sublimed. The movement of the disc $d$ is started and the water is admitted through the cooling arrangement. The substance to be sublimed is then introduced by the pipe $h$ into the fixed plate $f$. The vapours of the product condense on the cold wall of the disc $d$ above the sectors of the plate $f$. The disc, on turning, brings the sublimed product in contact with the scrapers $r$, which detach it and cause it to fall into the hoppers $v$ connected to the receivers $a^2$. The introduction of the substance to be purified is carried out continuously, and the output of the apparatus is likewise continuous. The non-sublimable parts remaining in the plate $f$ are removed at the lowest point of the sectors by the pipes $w$.

The following example which illustrates the method of using the apparatus, is given as non-restrictive.

Example

The sublimation of m-nitro-p-toluidine is carried out in the following manner: A vacuum of 12 mm./Hg is established inside the casing. The temperature of the plate and its inert filling is taken to 120–122° C. The temperature of the water circulating in the cooling arrangement is 15° C. The disc of the condenser is adjusted to a speed of 1.4 revolutions a minute; the crude m-nitro-p-toluidine is in the liquid state in a feed carboy where it is kept at 150° C. at atmospheric pressure. By means of a dipping tube provided with a needle-valve stopcock, it is introduced into the sublimation plate by simple aspiration at a regular flow of 100 ccs. in 4 minutes. Sublimation starts from the beginning of the introduction. The sublimed product falls into the collecting hopper and the flow is at a maximum after 10 minutes working. The hourly output of sublimed m-nitro-p-toluidine is 2000 gms. for a comsumption of heat energy equal to 650 v.a./hour.

The sublimed product is in the form of fine orange-yellow crystals whose melting point is 115° C. This product can be directly diazotised by the usual methods and does not give any residue. The tars which represent about 3% of the crude m-nitro-p-toluidine can be continuously eliminated from the sublimation chamber by collecting them at the lowest point of the plate.

We claim:

1. Apparatus for purification by sublimation which comprises a vacuum-tight casing, a fixed plate formed from at least two angularly spaced sectors of a circle commonly secured at their apices, means for supporting said plate in said casing, means for heating said plate, means for admitting a material to be purified to said plate, a rotating cooled disc disposed in closely spaced relationship above said plate, and scraping means disposed between the sectors contacting said disc for removing a sublimed product therefrom.

2. Apparatus as claimed in claim 1 in which the heating means is electrical.

3. Apparatus as claimed in claim 1 in which the rotating disc is cooled by water.

4. Apparatus as claimed in claim 1 in which the sectors contain inert material.

5. Apparatus as claimed in claim 1 in which a pipe for admitting material to be purified and a pipe for discharging non-sublimable impurities open into the base of each of the sectors.

6. Apparatus as claimed in claim 1 in which hoppers to receive purified product are disposed below the spaces between the sectors.

7. Apparatus for purification by sublimation which comprises a vacuum-tight casing, a plate formed from angularly spaced sectors of a circle commonly secured at their apices, an upturned flange on at least a portion of the periphery of said sectors, means resiliently supporting said plate in said casing, means for heating said plate, a rotating cooled hollow disc disposed in closely spaced relationship above said plate and contacting said upturned flanges, means for admitting a material to be purified to said plate, scraping means disposed between the sectors for scraping said disc and removing a sublimed product therefrom, and hoppers to receive the sublimed product disposed below said scrapers and between the spaces between the sectors, each sector being provided with an inlet for material to be sublimed and an outlet for non-sublimable impurities.

8. Apparatus for purification by sublimation which comprises a vacuum-tight casing, a relatively fixed plate formed from two angularly spaced sectors of a circle commonly secured at their apices, means for supporting said plate in said casing, each sector being provided with means for admitting material to be purified thereto and means for discharging non-sublimable impurities therefrom, means for heating said plate, a hollow disc disposed in closely spaced relationship above said plate, means for rotating said disc, means for cooling said disc, articulated scrapers in flexible contact with the lower face of said disc disposed between the sectors of said plate and hoppers to receive the purified product disposed below said scrapers and between the spaces between the sectors.

References Cited in the file of this patent

UNITED STATES PATENTS

| | | |
|---|---|---|
| 2,317,952 | Burk et al. | Apr. 27, 1943 |
| 2,327,788 | Hickman | Aug. 24, 1943 |
| 2,538,540 | Thurman | Jan. 16, 1951 |
| 2,840,459 | Karnofsky | June 24, 1958 |